United States Patent [19]

Fennema et al.

[11] Patent Number: 5,138,594
[45] Date of Patent: Aug. 11, 1992

[54] REDUCING AMPLITUDE VARIATIONS OF OPTICAL DISK READBACK SIGNALS AND INCREASING RELIABILITY OF TRACK-CROSSING COUNTS

[75] Inventors: Alan A. Fennema; Benjamin C. Fiorino, both of Tucson, Ariz.

[73] Assignee: International Business Machines Corporation, Armonk, N.Y.

[21] Appl. No.: 512,308

[22] Filed: Apr. 20, 1990

[51] Int. Cl.$^5$ .................. G11B 17/22; G11B 7/00
[52] U.S. Cl. .................. 369/44.29; 369/32; 369/44.26
[58] Field of Search ............ 369/44.27, 44.28, 44.29, 369/32, 44.11, 116, 44.41, 44.34, 44.26, 48; 360/77.06, 77.07, 77.08

[56] References Cited

U.S. PATENT DOCUMENTS

| | | | |
|---|---|---|---|
| 4,205,338 | 5/1980 | Schaeter | 369/46 |
| 4,286,318 | 8/1981 | Immink et al. | 364/118 |
| 4,527,263 | 7/1985 | Nakagawa | 369/46 |
| 4,611,317 | 9/1986 | Takeuchi et al. | 369/44.26 |
| 4,700,334 | 10/1987 | Shinkai | 369/44.26 |
| 4,751,693 | 6/1988 | Yoshimaru | 369/111 |
| 4,785,441 | 11/1988 | Tanaka et al. | 369/44.41 |
| 4,788,674 | 11/1988 | Deguchi et al. | 369/54 |
| 4,907,212 | 3/1990 | Pharris et al. | 369/44.26 |
| 4,914,725 | 4/1990 | Belser et al. | 360/77.06 |
| 5,038,333 | 8/1991 | Chow et al. | 369/44.27 |

Primary Examiner—Roy N. Envall, Jr.
Assistant Examiner—Nabil Hindi
Attorney, Agent, or Firm—H. F. Somermeyer

[57] ABSTRACT

An optical disk recorder includes disk reflectance calibration means for measuring variations in disk reflectance over the recording area of the disk. Correction factors based on measured reflectance for adjusting sensed signal level and gain reduce the effects of varying reflectance on the sensed signal. In a preferred embodiment, the sensed signal is employed as a signal in quadrature to a tracking error signal for ensuring reliable track counting in a track seeking operation. In a grooved medium, reflectance is calibrated for both grooves and mesas between the grooves.

9 Claims, 4 Drawing Sheets

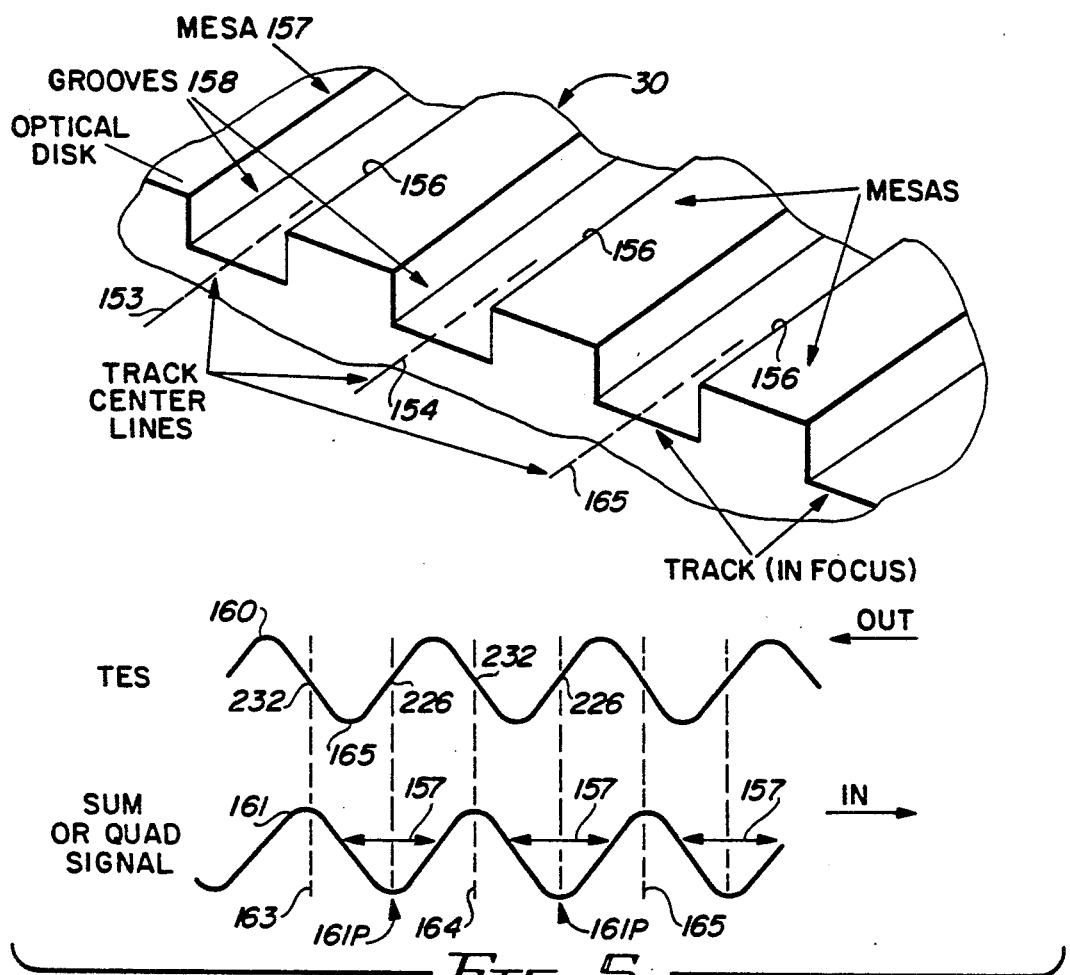
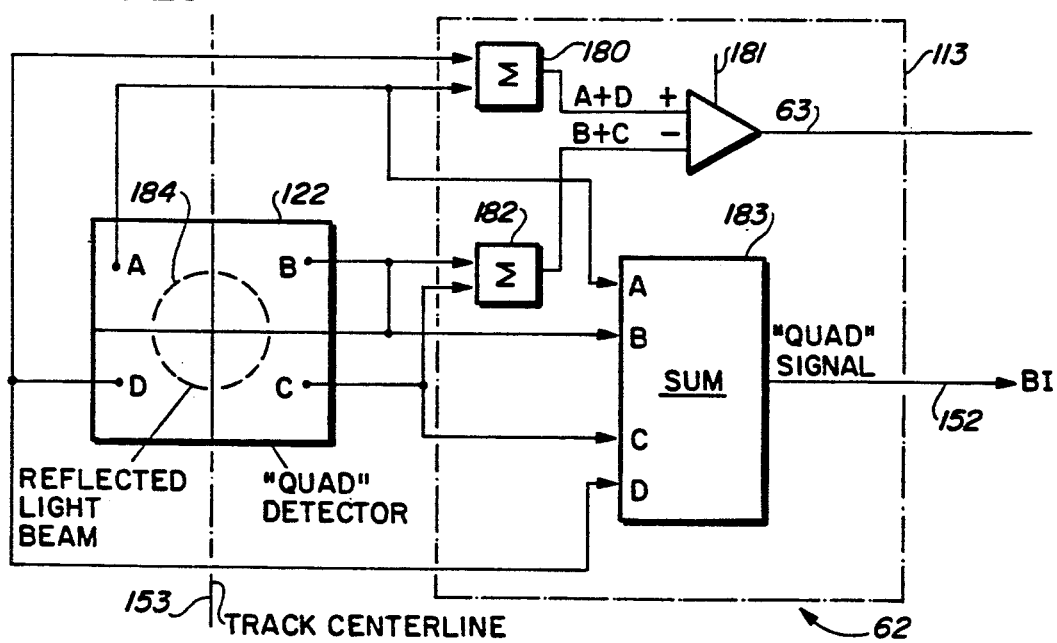

REDUCING AMPLITUDE VARIATIONS OF OPTICAL DISK READBACK SIGNALS AND INCREASING RELIABILITY OF TRACK-CROSSING COUNTS

DOCUMENT INCORPORATED BY REFERENCE

Co-pending, commonly-assigned application Belser, et al., Ser. No. 377,399, filed Jul. 10, 1989, now U.S. Pat. No. 4,914,725, is hereby incorporated by reference.

1. Field of the Invention

The present invention relates to sensing signals recorded on an optical disk and particularly for smoothing the amplitude variations of the readback signals and applying the smoothed readback signals as reliable track-crossing indicating signals for use during track seeking.

2. Background of the Invention

It has been determined that optical media, such as magnetooptic media, exhibit substantial variations of surface reflectivity throughout its recording area. Such variations apply to each individual track in the circumferential direction and radially across many of the tracks. In a system employing grooved media, the variations of the reflectivity apply not only to the grooves but to the mesas between the grooves. It is desired to provide a reduction in the ultimate signal effects of such reflectivity variations on a light beam reflected from a disk. Such a reduction in amplitude variation provides enhanced quality of signal processing by reducing the dynamic range of the signal. It is also desired to provide stabilized amplitude readback for use in positioning servo mechanism systems, particularly during track seeking operations wherein the transducer rapidly scans a large plurality of tracks. In grooved media, such track traversal includes scanning both grooves and mesas, both of which are subject to reflectivity changes throughout the recording area of the optical record medium.

Disk recorders of either the magnetic or optical type employ transducer positioning systems. Such transducer positioning systems often use a velocity servo loop for long transducer radial motions, termed seeks. Upon reaching a target track after leaving an origin track, the operation of the positioning systems switches from a velocity seek mode to a track following mode. In some instances, digital techniques are employed in the seeks while analog techniques are employed in the track following. Such a track following control may be favorably compared to a stop-lock positioning control in other servo positioning applications. In a subsequent seek operation, the track following position mode is interrupted to return to a velocity loop control or a second positioning loop of another form. In track seeking, reliable track counting has been a continuing problem.

One of the difficulties in track counting arises from the eccentricity in disk rotation combined with one micron intertrack spacing. Such so-called repeatable "runout" or "eccentricity of rotation" causes false direction of motion indications between a track being crossed and the absolute motion of the transducer. This problem increases at low radial speeds of the transducer. Accordingly, it is desired to provide for more reliable track seeking and control during the velocity portion of a track seek operation.

Another critical aspect of velocity servo control is the generation of a reliable velocity or speed indicating signal. The speed indicating signal often is derived from counting tracks as they are crossed, therefore, its reliability is dependent upon the reliability of the detection of track crossings by the transducer being moved. It is also desired to digitize portions of the track seeking and following system. Various techniques for enhancing the reliability of the positioning servo system while employing digital techniques are desired.

Optical recorders having the goal of high performance at low cost employ high-performance, servo-positioning systems. The mechanical construction used in connection with these positioning systems is a so-called "fine actuator," or actuator (also termed a secondary headarm or topping servo). The fine actuator is carried on a primary transducer or head-carrying arm which is radially movable by a so-called coarse actuator. The fine actuator is movably mounted on the coarse actuator to be served to a reference position marked on the coarse actuator. Typically, the fine actuator has had a high-frequency response characteristic for providing rapid and short-distance positioning motions of the transducer with respect to a track being followed or moving from one track to a second or target track that is relatively close to the one or origin track. The coarse servo which positions a relatively large mass primary head-carrying arm typically has low frequency characteristics for handling the longer moves. For optimizing the relationship for top performance between such fine and coarse actuators, positioning servo systems provide for the coarse actuator to always follow the movements of the fine actuator. Such arrangements have been colloquially called "piggy-back" carriage servo systems. The fine or secondary actuator carried lens crosses track areas and intertrack areas at high speed. The light amplitude variation during such traversal must be limited for reliable track crossing counting.

3. Discussion of the Prior Art

Schaefer in U.S. Pat. No. 4,205,338 shows a track following system in which components of a radial tracking signal are stored in a separate storage system during a prerecording interval. During recording, these stored components produce a restored radial tracking signal used to radially position the recording energy source or laser for keeping newly-recorded tracks at a fixed distance from previously-recorded tracks. This patent is cited for showing external storage of information which indicates parameters which are circumferentially displaced along a circular track of an optical recording disk. This does not show how to compensate for amplitude variations along said circumferential position, particularly where that crossing counting is to be performed.

Nakagawa in U.S. Pat. No. 4,527,263 shows an optical disk which has an external memory circuit for storing an eccentric displacement for one revolution, i.e., one rotation of an optical disk. The memory circuit receives a signal from an eccentric displacement detector which detects eccentric displacement of the optical disk on the basis of an optical signal sensed through an optical head. In the recording and reproducing mode, the position of the optical head is controlled to compensate for eccentric displacement on the basis of the eccentric displacement data stored in the memory circuit.

Immink et al. in U.S. Pat. No. 4,286,318 shows a control loop with a control unit for realizing a transfer characteristic having a number of peaks at a fundamental frequency and at harmonics of the fundamental frequency. The control unit comprises a memory for digitally storing a number of samples of an error signal appearing in the control loop during a cycle period equal to the period corresponding to the fundamental frequency. There are also provided means for comparing the sample stored in the memory with the value of the error signal one cycle period later and depending upon this comparison, correcting the memory contents of the relevant memory location. Variation of the error signal amplitude stored in the memory device is cyclically employed as a control signal for a control device including the control loop. This patent includes use of the stored error signal for controlling the position of a controlled member in a servo control loop. This patent is cited for showing the storage of amplitude indicating signals in a control loop associable with an optical disk.

The document incorporated by reference shows the use of a quadrature signal in conjunction with a tracking error signal for unambiguously indicating the track crossing direction and track crossing counting. It has been determined that the amplitude variations of the tracking error signal and a signal in phase quadrature to the tracking error signal introduces undesired error conditions into the track crossing direction indication and counting. It is desired to use the techniques of the co-pending application for track crossing counting and direction indications but to provide a more reliable quadrature signal.

In a preferred embodiment, a four-element, rectangularly-arranged detector is employed for generating a tracking error signal in the known manner. The quadrature signal is generated by summing the photocurrent outputs from all four of the elements of the detector which provides, in effect, a data signal. The co-pending document incorporated by reference teaches that this summed signal is in quadrature to the tracking error signal. By combining and comparing the quadrature signal with the tracking error signal, not only can track crossings be counted, but also the direction of the transducer motion relative to each and every track provides a reliable track crossing counter.

SUMMARY OF THE INVENTION

It is an object of the invention to provide an improved amplitude stabilized signal from an optical disk. Included in this object is providing a sensed signal having amplitude stabilization in both groove and mesa portions of a grooved optical medium, particularly, for a magnetooptic medium.

In accordance with the invention, the reflectance of an optical disk is calibrated circumferentially and radially of the disk in the recording area. Correction data are generated from sensing the variations in reflectance and storing the correction data in an external memory. During readback, the correction data is employed for changing the amplitude of the sensed or readback signal in accordance with the stored data, i.e., lower reflectance portions of the disk have greater gain in the sensing such that the provided sensed signal amplitude tends to be stabilized with circumference and radius positions of the optical disk. Such calibration is provided in both the groove and land, or mesa, areas such that the stabilized signal can be used as a reliable signal during track seeking operations.

In a specific form of the invention, the amplitude stabilized signal is used as a quadrature signal to a tracking error signal sensed from the same optical disk through the same transducer for reliably indicating track crossings and direction of track crossings. The foregoing and other objects, features, and advantages of the invention will be apparent from the following more particular description of preferred embodiments of the invention, as illustrated in the accompanying drawings.

DESCRIPTION OF THE DRAWING

FIG. 5 diagrammatically illustrates the relationship of tracks of a grooved magnetooptic medium usable with the FIG. 3-illustrated recorder and showing the relationship of a tracking error signal and a sum or quad signal with respect to tracks on the medium.

FIG. 7 is a simplified block circuit diagram illustrating the generation of a tracking error signal and its quadrature signal shown in FIG. 5.

DETAILED DESCRIPTION

Referring now more particularly to the appended drawing, like numerals indicate like parts and structural features in the various figures. It has been determined that the reflectance of a recording surface of an optical disk 30 changes dramatically both with angular and circumferential positions of the disk. Such changes in reflectance result in a rapidly shifting level of output amplitude, such as shown by signal levels 20 and 21 of reflected light intensities found in optical disk 30. Signal lead 20 represents changes in optical reflectance (optical reflectance is indicated by the intensity of the reflected light from a constant intensity sensing light beam) of a land or mesa area. Signal level 21 represents the measured reflectance changes circumferentially of the disk of a groove or track which may contain data signals to be sensed and receive data signals to be recorded. Such rapid level changes tend to obscure the true information-bearing alternating current component contained in the reflected light beam. Such reflectance characteristics contribute to making the sensed signal based upon the reflected light beam unusable, particularly on optical media having relatively shallow, grooved depths. It should be noted that shallow grooves in optical media tend to improve the signal-to-noise ratio for signals recorded in the track of the groove, such as data signals or other forms of information-bearing signals. Therefore, shallow grooves are desired. It has also been observed that the reflectivity of the optical disk, while changing dramatically across its a real extent does change consistently. This enables the measurement and storing of measured changes for zones or bands of record tracks on the disk, as well as mesas, or land areas, intermediate the grooves or track. Such stored or memorized data are used to adjust signal processing during sensing or readback for removing the effects of the dramatic shifts in signal level caused by the reflectance changes.

It has been determined that in a magnetooptic disk, the reflectivity of the disk area does not vary significantly over a limited range, i.e., over 2-5 mm, for example. In high performance optical systems, the disk is rotated at relatively high speed resulting in changes of reflectance being encountered rapidly and being passed over rapidly. Further, the radial speed of a beam during a track seek operation occurs over a relatively small portion of a track but also is at a speed which is a small portion of the angular velocity or rotational speed of the beam relative to the disk. This speed relationship combined with high track densities available on optical media result in a small variation of reflected light despite motions of several hundred tracks. Therefore, this band of several hundred tracks is characterized by a single rotation of a single disk and yet provides satisfactory accommodation of dynamic variations of reflectance of the disk surface.

Figure 2:
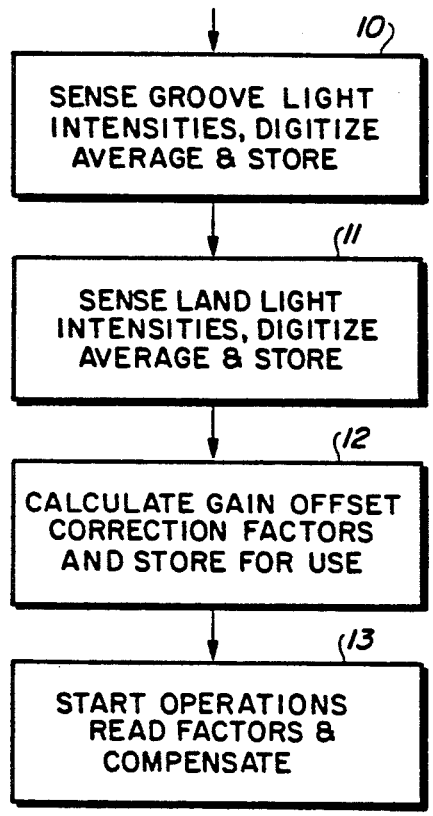
FIG. 2 is a simplified flowchart showing a sequence in machine operations for reducing the effects of reflectance changes as shown in FIG. 1 of an optical disk for enabling more reliable signal processing of a sensed signal from such optical disk.

In each radial band or zone of tracks, the optical reflectance calibration or correction factors are determined by respectively causing the transducer to track follow a groove or track during disk rotation. The reflected light signal from a constant intensity sensing light signal from a laser results in a reflected light signal that is tangential to the negative peaks of a signal which would be reflected if the transducer were moving transversely to the track direction, i.e., during a track seeking operation. The signal sensed during track following in step 10 (FIG. 2) is digitized and stored in a suitable data storage unit as a function of angular or circumferential position. Similarly, in step 11, the optical transducer is operated to follow a mesa adjacent to the just-sensed track-followed groove and within the zone of tracks to be accommodated. The reflected light from such mesa produces a signal which is tangential to the signal peaks (the radial midpoint of the load area corresponding to heads 161P of signal 161 of FIG. 5) of the AC component of the reflected light when the transducer is moving transversely to the land area, i.e., during a track seek. The sensed signal from the land area is digitized and stored in a data storage unit. It is preferred that in each of the steps 10 and 11 that a plurality of rotations of the disk medium be used for obtaining a plurality of readings. The readback values are then averaged for producing an average value for all of the measurements. Such repeated readings can be done on the same groove and on the same land or mesa area or can be done on a plurality of grooves and mesa areas within the radial zone of tracks to be accommodated. The result of storing these factors, as will become apparent, is that the later-described recorder can adjust the sensed signal during track crossing, i.e., during track seeking for each angular position by using a gain-correction factor calculated in step 12. Such gain-correction factor is obtained by subtracting the two signal level 20, 21 amplitude values at the respective angular or circumferential positions. Compensation step 13 is merely subtracting the calculated offset correction from the signal sensed during the track crossings for restoring the effective DC component of the signal to remove the amplitude modulation from the waveform envelope created during sensing. The offset and gain correction factors provided by the calculation in step 12 are stored in a table of a data storage unit having both radial and angular address coordinates. The movement of the transducer radially of the record tracks at any angular position of the rotating disk has the readback signal DC-lead corrected using these stored values. Signal processing for the coordinates of the laser beam is used to generate the quadrature signal, later described. The advantage of this approach is that only one laser beam is required to obtain a usable quadrature signal to a tracking error signal generated, as later described, for reliably indicating track crossings and for indicating the direction of track crossings and then providing an accurate track crossing count. This invention also allows the use of a more shallow grooved optical media for enhancing the signal-to-noise ratio of stored data signals and yet provide for reliable quadrature track crossing counting. It is also noted that the quality of the quadrature signal is independent of the track crossing frequency, an important feature.

Figure 3:
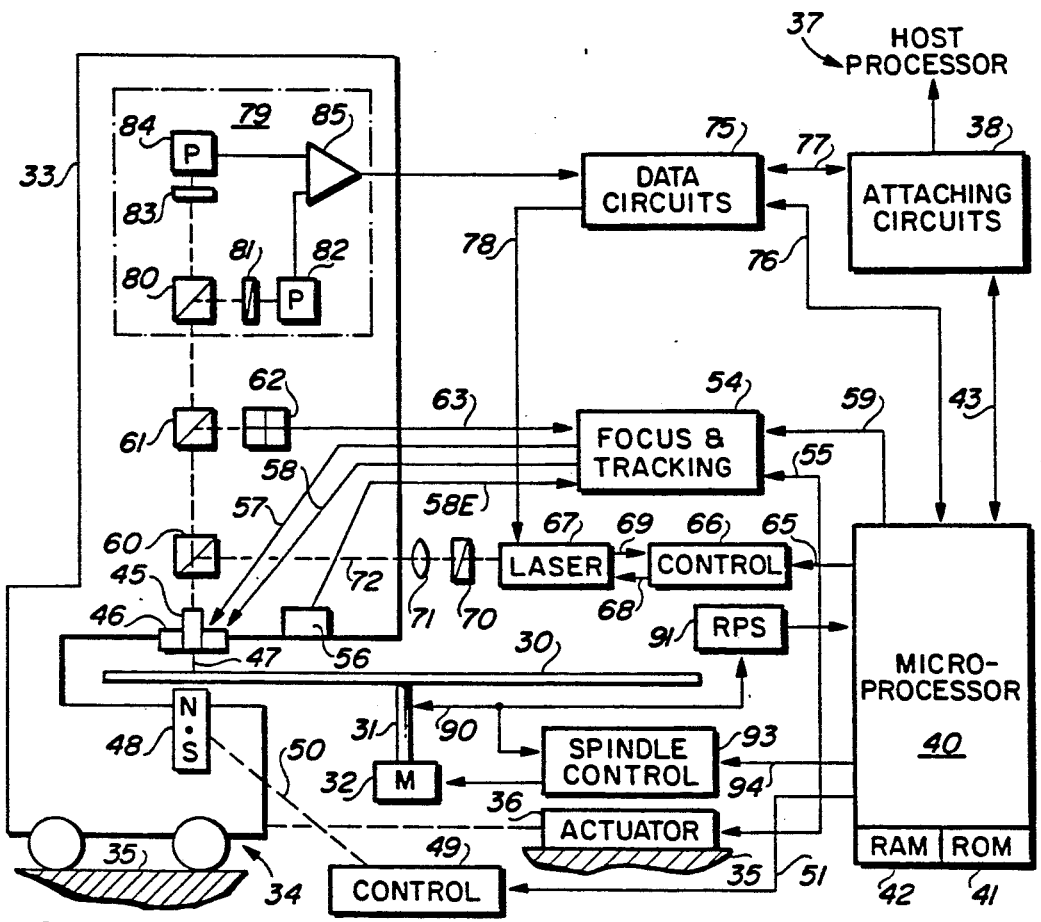
FIG. 3 is a simplified block diagram showing an optical magnetooptic recorder and readback system with which the present invention is advantageously employed.

An optical recorder with which the present invention may be advantageously employed is shown in FIG. 3. A magnetooptic record disk 30 is mounted for rotation on spindle 31 by motor 32. Optical head-carrying arm 33 on headarm carriage generally denoted by numeral 34 moves radially of disk 30. A frame 35 of recorder suitably mounts carriage 34 for reciprocating radial motions. The radial motions of carriage 34 enable access to any one of a plurality of concentric tracks or circumvolutions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image signal processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcodestoring, read-only memory (ROM) 41 and a data and control signal storing random-access memory (RAM) 42.

The optics of the recorder include an objective or focusing lens 45 mounted for focusing and radial tracking motions on headarm 33 by fine actuator 46. This actuator includes mechanisms for moving lens 45 toward and away from disk 30 for focusing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 in a constructed embodiment (magnet 48 is an electromagnet) provides a weak magnetic steering field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet 48 control 49, which is operatively coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 46 is precisely controlled by control signals supplied by circuits 54 over line 55 to actuator 36. Additionally, the actuator control by circuits 54 is exercised by control signals travelling over lines 57 and 58 respectively for focus and track following and seeking actions of fine actuator 46. Sensor 56 senses the relative position of fine actuator 46 to headarm carriage 33. To supply on relative position signal over line 58E to focus and tracking circuits 54. The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photoelements which respectively supply signals on four lines, as detailed in FIG. 7, to focus and tracking circuits 54. Aligning one axis of the detector 62 with a track center line, track following operations are enabled. Microprocessor 40 supplies track address information over cable 59 to circuits 54 in a usual manner. Circuit 54 respond to such addresses for effecting track seek operations, later described. Focusing operations are achieved by comparing the light intensities detected by the four photoelements in the quad detector 62. Focus and tracking circuits 54 analyze the quad detector 62 signals to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser, such as a gallium-arsenide diode laser, can be modulated by data signals so the emitted light beam represents the data to be recorded by intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplying suitable control signals over line 76. Microprocessor 40 in preparing circuits 75 is responding to commands for recording received from a host processor 37 via attaching circuits 38. Once data circuits 75 are prepared, data is transferred directly between host processor 37 data circuits 75 through attaching circuits 38. Data circuits 75, also ancillary circuits (not shown), relating to disk 30 format signals, error detection and correction and the like. Circuits 75, during a read or recovery action, strip the ancillary signals from the readback signals before supply corrected data signals over bus 77 to host processor 37 via attachment circuits 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the headarm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photocell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photocell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to rotational position sensing (RPS) circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

Figure 4:
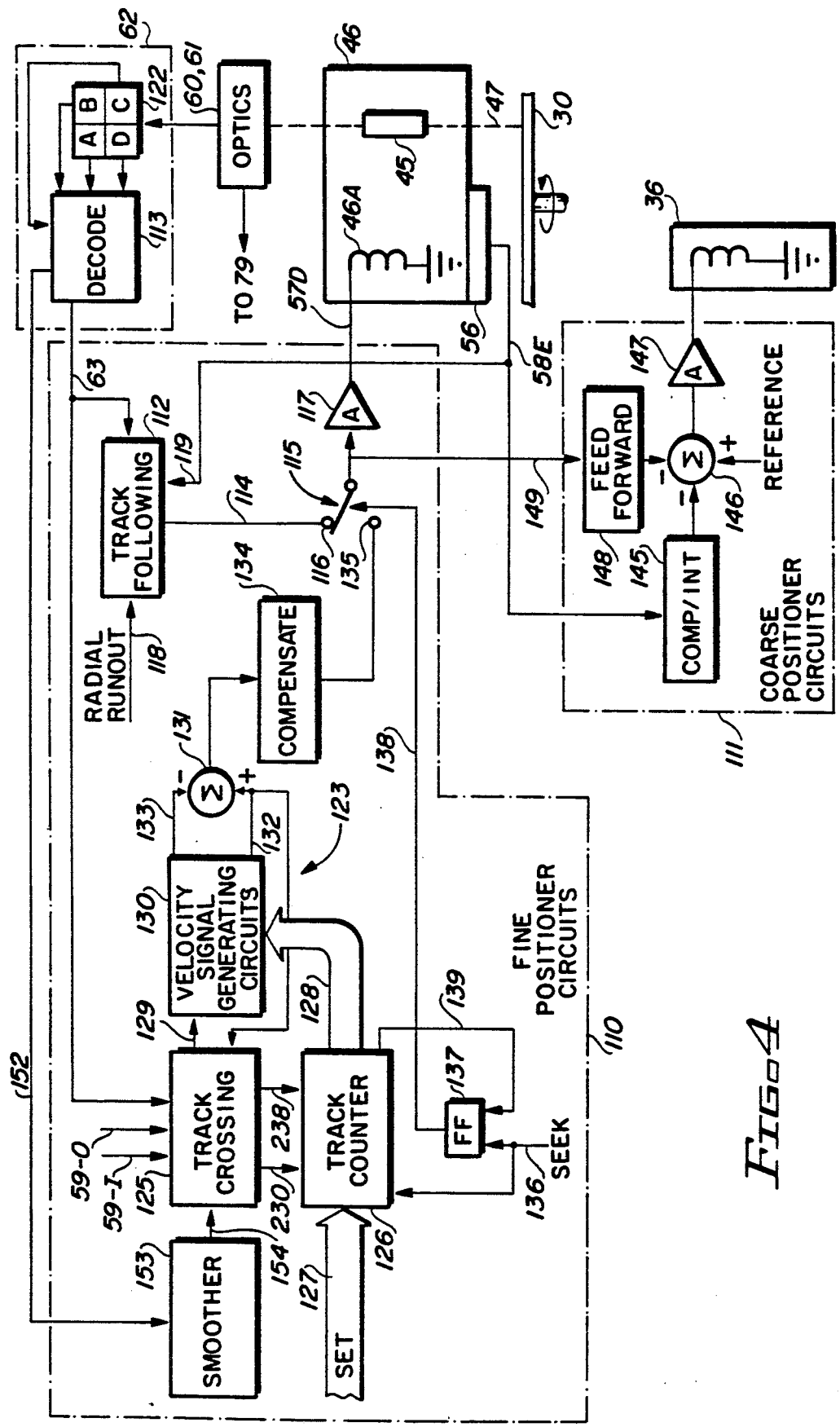
FIG. 4 is a simplified block diagram of a track seeking system usable with the FIG. 3-illustrated recorder and which illustrates certain aspects of the present invention.

FIG. 4 illustrates the seeking and track-following portions of focus and tracking circuits 54. The tracking and seeking portions include fine actuator 46 positioning circuits 110 and coarse positioner 36 positioning circuits 111. The coarse positioner circuits 111 operate such that the coarse actuator 36 always moves the headarm 33 to follow the motions of fine actuator 46. Fine positioner circuits 110 actuate actuator 46 to move objective lens 45 such that a laser beam traveling along light path 47 scans a single track during track-following operations and moves radially of the disk 30 for crossing the tracks during a track-seek operation. For track-following operations, track-following circuit 112 receives a sensed tracking error signal TES over line 63 from decoder 113 (detailed in FIG. 7) derived from the signals generated by four detector element 122 of detector 62 to provide a track-following control signal over line 114. The line 114 control signal then passes through electronic switch 115, entering at track-follow terminal 116, for controlling power output amplifier 117. Power amplifier 117 supplies an actuating signal over line 57D to actuator coil 46A of fine actuator 46. During track following, the drive current on line 57D causes the actuator 46 to move radially along the headarm 33 for maintaining the position of the light beam 47 on a single track.

The detector element 122 has independent photoresponsive elements A, B, C and D arranged in a rectangular array to provide tracking-error indicating photoelectric signals to decode circuit 113. The axis of the rectangle of detector element 122 lying between paired photoelements A, B and D, C is aligned with the axis of the track being followed. Decode circuit 113 responds to the four photoelement signals to provide a tracking error signal, as is well known and as later described herein. In track-following circuit 112, the tracking error signal actuates servo circuits in a known manner. Operation of track-following circuit 112 is modified by a radial runout input signal received over line 118. A disk profile is generated for the disk 30 which indicates the expected repeatable radial runout. Track-following circuits 112 respond to the radial runout signal for modifying the tracking error signal TES to anticipate the radial runout thereby providing more faithful track following. Additionally, relative position sensor 56 mounted on headarm 33 senses relative displacement error between fine actuator 46 and headarm 33. Sensor 56 supplies a relative position displacement error signal (RPE) over line 58E, thence line 119, to track-follow circuits 112 for modifying the TES offset. Such offset is caused by relative motion of coarse carriage 33 with fine carriage or actuator 46. The offset is compensated for by feeding the RPE signal from sensor 56 to fine actuator 46.

Velocity seek loop circuits, generally denoted by numeral 123, constitute all of the electronic circuits providing a signal to the seek input terminal 135 of seek-follow switch 115. Whenever a seek is instituted by microprocessor 40, electronic switch 115 is moved from terminal 116 to terminal 135 for disconnecting the track-following circuit 112 from amplifier 117 and connecting the velocity-servo loop circuits 123 to amplifier 117.

Circuits 123 respond to several input signals for effecting a velocity-controlled seek. Track-crossing circuit 125 receives the sensed TES signal over line 63 for detecting when the beam 47 is crossing a track (see FIG. 7 for physical track details) on disk 30. Each time a track crossing is detected by circuit 125, a track counting pulse is supplied to track counter 126 for changing the number of tracks to go, as detailed in FIG. 9. It may be noted that in some embodiments, a single track crossing is represented by two zero crossings of the tracking error signal on line 63 such that two pulses are provided to track counter 126 for indicating a single track crossing. At the time microprocessor 40 actuates circuits 110 to do a seek, microprocessor 40 supplies the number of tracks to be crossed over bus 127 (part of cable 59 of FIG. 3) for pre-setting track counter 126 for the upcoming seek operation. Track counter 126 continuously outputs the number of tracks-to-go over bus 128 to velocity circuits 130. Velocity circuits 130 respond to a velocity profile designed for the seek operation for generating a reference signal and a measured speed indicating signal. The speed reference signal supplied over line 132 is based upon the velocity profile desired for the seek operation and the current distance to go in the tracks to be crossed. The measured speed signal is supplied over line 133 to be subtracted from the reference signal on line 132 by sum circuit 131. The resultant speed error signal supplied by sum circuit 131 alters the operation of fine actuator 46 to closely follow the velocity profile. See the document incorporated by reference for details.

Each time microprocessor 40 initiates a track seek operation, it also supplies a SEEK signal over line 136 to set flip-flop FF 137 to the active seek condition and causes track counter 126 to receive the distance-to-go signals from cable 127. FF 137 being in the seek state supplies a switch-actuating signal over line 138 to move switch 115 to disconnect track following circuit 112 and connect seek circuit 123 to power amplifier 117. The sum circuit 131 supplies its velocity-error signal through compensator 134 to seek terminal 135. This velocity operation continues until the end of the seek, which occurs at one-quarter track pitch from the target track. At this point, track-follow circuit 112 is again re-energized and the velocity circuits 123 are disconnected from actuator 46. Track capture, i.e, switching from track seeking to track following on the target track, is indicated by track counter 126 one-quarter track pulse supplied over line 139 to reset FF 137. Resetting FF 137 at one-quarter track pitch-to-go causes a deactivating signal to be supplied over line 138 for moving the switch 115 from seek terminal 135 back to the follow terminal 116.

Figure 8:
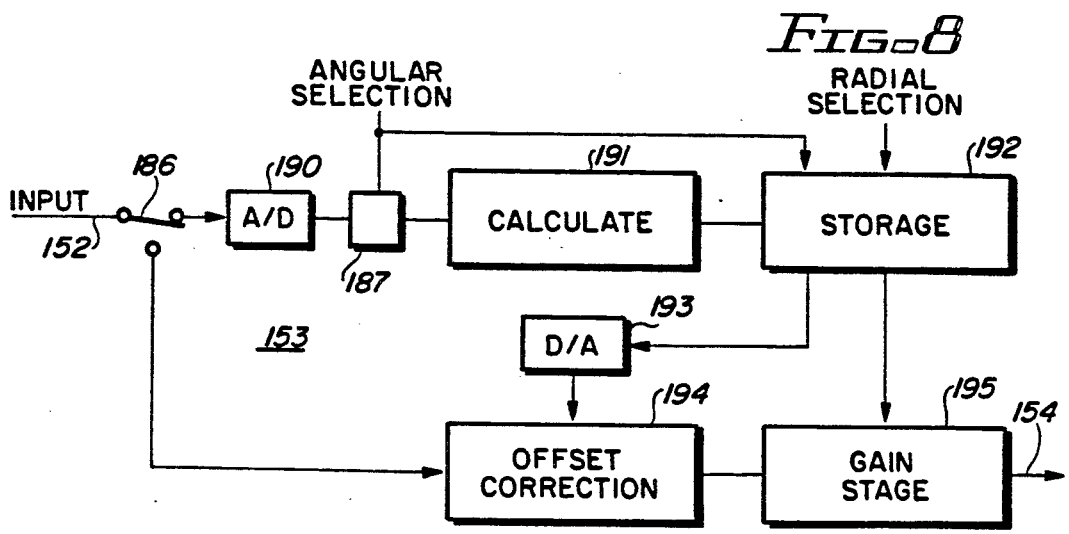
FIG. 8 is a simplified block diagram of circuit means incorporable into the FIG. 3-illustrated recorder for practicing the present invention.
Figure 9:
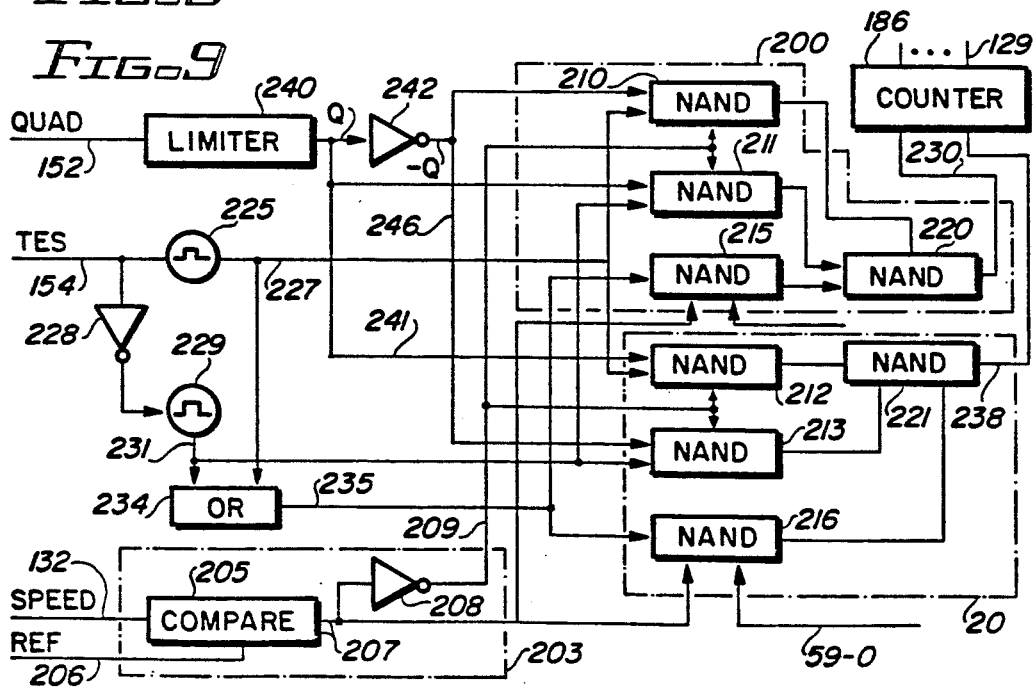
FIG. 9 is a simplified block diagram showing the use of quadrature signal and a tracking error signal for generating reliable track counts including direction of track counts in an optical signal recorder such as shown in FIG. 3.

For causing the the coarse actuator 36 to follow fine actuator 46 motions, coarse positioner circuit 111 receives the relative position error signal from detector 56 over line 58E. Compensator and integrator COMP-/INT 145 responds to the error signal to supply a smoothed and integrated error signal to sum circuit 146. Sum circuit 146 compares the error signal from compensator integrator 145 with a reference signal for supplying a control signal through amplifier 147 causing the coarse actuator 36 to move headarm 33 to follow the motions of actuator 46. During seek operations, it is desired to actuate coarse actuator 36 to move headarm 33 more quickly for limiting the relative position between the fine and coarse actuators 46, 36. To this end, the drive signal supplied to amplifier 117 for driving fine actuator 46 is also supplied over line 149 to feed-forward circuit 148. Feed-forward circuit 148 is a gain control and signal-smoothing circuit of usual design. Feed-forward circuit 148 supplies its output signal to sum circuit 146. The feed-forward circuit 148 output signal is added by sum circuit 146 to the signal from element 145 and subtracted from the reference signal for actuating coarse actuator 36 to a maximal actuation, particularly during acceleration mode. In accordance with the invention, at relatively low radial seek speeds, the quadrature signal for TES (generated as later described including the reflectance variation accommodation) is provided to track counter 126 via the track crossing circuits 125 as shown in FIG. 9, for unambiguously providing reliable track counting and direction indication. The sum of the photocurrents from detector portions A, B, C, D of detector 122 are combined in decode circuit 113 (FIG. 4) and supplied over line 152 to a smoother circuit 153. Circuit 153 corrects the TES signal for reflectance variation as shown in FIG. 8. The DC level corrected TES signal smoothed in accordance with radius and circumferential position is supplied by circuit 153 over line 154 to track crossing circuit 125. That quadrature signal is compared as detailed in FIG. 9 with the tracking error signal TES 160 supplied from circuit 153 as detailed in FIG. 9 to provide reliable track count decrementation and incrementation for accommodating relative direction changes of the beam and the tracks during a low speed track seek. This accommodation is particularly important during relatively low radial speed of the beam as the eccentricity or runout of the disk 30 can cause changes in the relative direction of the track crossing between the various tracks and the beam, as is well known. At high radial seek speeds, the comparison of the quadrature signal with the TES is dispeared with.

FIG. 5 shows an abbreviated portion of the disk 30, wherein the record tracks having track center lines 163, 164 and 165, are shown as being aligned with and in the grooves 158 of the grooved medium or disk 30. The grooves are concentric circles on disk 30, shown as straight lines for purposes of illustration only. Track center lines 163, 164, and 165 lie along the center of the respective grooves. As the light beam impinges upon the medium 30, and is focused to the tracks in the grooves, the maximum reflection light intensity is provided to the detector 62 (chip 122) as indicated by dashed line circle 184 of FIG. 7. As the beam moves crosswise of the track, the intensity of the reflected light diminishes and passes through a zero axis crossing at the vertical boundaries between the grooves and the mesas, as indicated collectively by numeral 156. On top of the mesas 157, the track is out of focus causing the amplitude to be further reduced from the in-focus reflection, thereby resulting in a negative peak intermediate the tracks, see signal 160 at negative peak 165. The sum or quad signal 161, later described with respect to FIG. 7, is in phase quadrature to tracking error signal 160 and is used as shown in FIG. 9.

Figure 6:
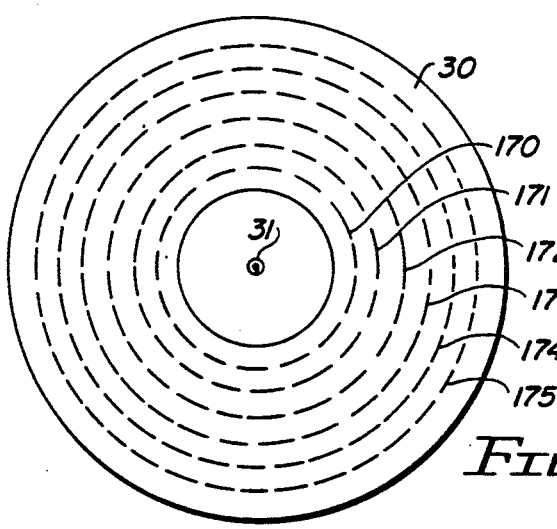
FIG. 6 is a simplified plan view diagram of an optical disk for illustrating the reflectance calibration techniques of the present invention.

Referring next to FIG. 6, the a real extent of disk 30 is diagrammatically illustrated. The concentric circular dashed lines 170–175 respectively denominate boundaries of radial zones of record tracks. Each of the zone of tracks lying respectively between radially-adjacent ones of the concentric circular dashed lines 170–175 use the same reflectance change accommodating correction factor at each calibrated angular positions within the zone. The correction factor at each circumferential position in the zone between lines 170 and 171 is constant throughout the radius of that zone. In one zone, there may be 36 or more angular positions at which the correction factor has been calculated and stored in an external memory, as will become apparent. In a similar manner, all of the zones between the other concentric circular lines 171–175 are similarly established. The number of zones shown in FIG. 6 are merely exemplary without limitation. It is preferred in a practical embodiment that a greater number of radial zones be employed for accommodating reflectance changes along the radial dimension. The number of zones actually selected is best empirically determined for each set of disk specifications and servo positioning systems.

FIG. 7 shows the generation of a signal 161 in phase quadrature to a tracking error signal 160. Decoder 113 is shown as a simplified block diagram is also described. Detector element 122 has four electrically-independent photoresponsive elements A, B, C and D. For generating a tracking error signal on line 63, the elements A and D are connected to analog current summing circuit 180 to supply the sum signal A+D to the positive input of differential amplifier 181. Similarly, elements B and C have their output signals connected to a second current summing circuit 182, which, in turn, supplies its sum signal B+C to the negative input of differential amplifier 181. The signal amplitude difference between the current sums of A+D and B+C constitute the tracking error signal 160 on line 63. Detector element 122 is aligned such that the axis 163 between the element pairs A and D and the element pairs B and C lies along a track center line being followed, such as the track center line 167. During track following, the relative position of track center line 167 will relatively move with respect to the elements A, B, C and D, thereby providing different light intensities to the element pairs for generating a tracking error signal truly indicative of the spatial relationship of the beam 47, with respect to a track being followed. During track seeking, the TES signal 160 is generated, as seen in FIG. 5.

The line 152 signal 161 is merely a sum of the currents from all of the electrical elements A, B, C and D of detector 122. The sum or quad signal 161 is generated by sum circuit 183. Examination of FIG. 5 shows that the quad signal 161 is 90 degrees phase displaced from TES signal 160, thereby satisfying the quadrature requirements for indication of motion direction.

Figure 1:
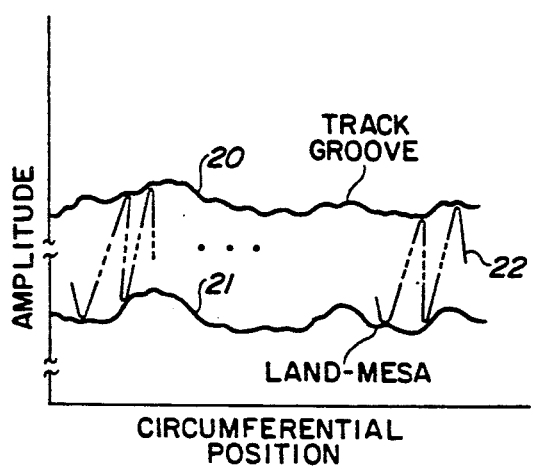
FIG. 1 graphically represents the reflectance changes with circumference in land and groove areas of a grooved optical disk of the magnetooptic type.

FIG. 8 diagrammatically illustrates the functions of smoother circuit 153. It is to be appreciated that in a constructed embodiment, microprocessor 40, as hereinafter pointed out, will play a significant role in the smoothing operation. As mentioned above, two correction factors are employed for each of the circumferential and radial positions. The level offset correction factor is established as the average amplitude of the stored signals for each circumferential and position within the radial zone referred to in FIG. 6. The second correction factor is the gain correction factor which is related to the peak-to-peak value and is calculated by merely subtracting the average of the value of exvelope signal 21 (FIG. 1) which is the exvelope of the negative peak value of the reflected read back signal 22 or from the average value of envelope signal 20 which is the envelope of the positive peak values of signal 22 measured during the calibration phase. Therefore, the DC level offset correction is derived solely from scanning the groove or track area while the gain correction factor is established by scanning not only the groove or track area but also each mesa intervening two adjacent grooves, one of which is being used for generating the level offset correction factor. The signals generated during steps 10 and 11 (FIG. 2) supplied over line 152 from summer circuit 183 (FIG. 7) are directed by electronic switch 186 during the calibration phase to the measurement circuits. A/D converter 190 converts the analog signal on line 152 to digital values. Measurements for each set are at a constant radial position. The angular selection is provided by a set of electronic signal gates 187 which are opened at the predetermined circumferential or angular positions of the track, such as at every ten degrees angle. The digitized value passes through the gates 187 to calculate circuits 191. Circuits 191 merely accumulate the measured values over a predetermined number of disk rotations, as ten. Upon completion of ten rotations, the measured values at each of the angular measuring positions are respectively averaged and inserted into storage unit 192 as the mean DC level value and constitute the level offset correction factors in storage 192. The mean value is one-half of the sum of the amplitude values of signals 20 and 21. The adjustment is the difference signal value between the signals 20 and 21. Completing step 10, microprocessor 40 causes the focus and tracking circuits 54 to move the transducer objective lens 45 from the groove to the immediate adjacent mesa, such as from the track represented by center line 163 to a mesa 158A immediately adjacent thereto, then step 11 is performed in the same manner as described for step 10 with the values of the level offset correction being stored in storage 192. It should be remembered that the mesa level offset correction offset factors represent the negative peaks 165 (FIG. 5) (signal 21 of FIG. 1) of the tracking error signal and are used as described above.

Upon completion of step 11 which is performed in the same manner as step 10, calculate circuits 191 read the mesa level correction factors from storage 192 and subtract same from the step 10 groove level correction factor signals of storage 192 and stow the difference in storage 192 as gain correction factors replacing the mesa level correction factors; that is, the gain correction factors are stored in the registers (not shown) of storage 192 used to store the mesa level correction measured values. This operation completes the calibration phase corresponding to steps 10, 11 and 12 of FIG. 2. In a practical embodiment electronic switch 186 is connected to line 152 of FIG. 4. The calculate circuits 191 are preferably replaced by microcode programming of microprocessor 40 of FIG. 3. Storage 192 is preferably RAM 42, D/A converter 193 offset correction circuits 194 and gain stage 195 are physically present in the smoother circuit 153.

The above description relates only to making the set of calibration values for a single zone. A radial selection signal on line 200 which is from microprocessor 40 changes the register addressing of storage 192 for each of the respective radial zones, such that each radial zone can have its own set of circumferential or angular level correction and gain correction factors. The steps 10–12 are described with respect to FIG. 8 are repeated for each of the radial zones with the angular selection being the same for all of the radial zones.

In operating during data processing, the angular selection and the radial selection select the correction factors at the appropriate times for correcting the sensed signals, particularly during tracking operations for ensuring a high quality quadrature signal. Offset correction circuits 194 can be a mere level shifter while gain stage 195 is any ordinary variable gain amplifier. The angular selection values are rotational position indications. The generated usual manner such as by the RPS circuit 91 of FIG. 3 which receives rotational position indicating signals over line 90 based upon the rotational position of the shaft 31. Alternatively, the rotational position of disk 30 may be sensed by a tachometer placed upon the disk 30 which can be done in a known manner. Radial selection is determined merely by the track address generated by microprocessor 40 and supplied to the focus and tracking circuits 54 as above described. Further details of the angular selection and radial selection operations are dispensed with for purposes of brevity. FIG. 9 illustrates a track-counting control signal circuit 125 using the corrected tracking error signal TES 160 and sum (QUAD or Q) signal 161. The connected TES signal 160 and QUAD signal 161, respectively, are received over lines 152 and 154. Later described circuits 200 and 201 respectively, generate radially inward indicating motion pulses and radially outward motion indicating pulses. The inward pulses travel over line 230 to counter 126 while the outward motion indicating pulses travel over line 238 to counter 126 during a low speed portion of a seek or a low speed seek. The runout or eccentricity of this 30 may cause actual changes in relative direction of the track with respect to the laser beam 47; that is, when the actuator 46 is moving radially slowly, the movement of the track caused by eccentricity of the disk 30 may indeed cause a retrograde movement with respect to the tracks due to the relatively fast eccentricity motion. At higher radially speeds, the beam 47's radially velocity is sufficient to overcome any eccentricity motion cause track counting errors. Accordingly, velocity control circuit 203 actuates the circuits 200 and 201 to provide for eccentricity compensation during low seek speeds while ignoring eccentricity compensation during high speed portions of a seek. The compensation for eccentricity (which cause track counting errors) is achieved by comparing the tracking error signal TES 160 with the sum signal 161 (FIG. 5) for determining the actual relative motion between tracks and the laser beam 47.

The velocity control circuit 203 consists of a velocity compare circuit 205 which receives the measured velocity signal from velocity circuits 130 over line 132. The measured velocity signal on line 132 is compared with the reference signals supplied over line 206, as from a microprocessor 40; or it may be a pre-set value in a ram (not shown). Compare circuit 205 is a switching compare circuit such that whenever the speed signal on line 132 exceeds the reference value on line 206 an activating signal is supplied over line 207 to later describes NAND circuit 215 and 216 for activating those two NAND circuits to pass later described track crossing indicating pulses. Inverter circuit 208 inverts the line 207 activating signal to pass an activating signal over line 209 whenever the speed signal on line 132 is less than the reference signal. The output activating signal inverter 208 occurs during low speed portions of a seek or during low speed seeks for activating NAND circuits 210–213 for effecting a compare between the QUAD signal on line 152 and the receive TES signal on line 154 for determining actual relative direction of motion of laser beam 47 and the surface of disk 30 at the point of inpingement of such laser beam.

NAND circuits 220 and 221 respectively and circuits 200 and 201 select which of the NAND circuits 210–213 215 and 216 are output pulses are to be passed to counter 126.

Processing of TES signal 160 (FIG. 5) is next described. Pulse generating circuit 225 TES signal 160 when the direction of the motion is radially inward when numeral 226 signifies the positive going transitions whereas a radially outward motion numeral 232 signifies a positive going transition. Note that FIG. 5 is a special diagram wherein the TES signal 160 is related to the disc structure 30. Inverter circuit 228 inverts the TES signal oh line 154 and supplies inverted signal to pulser 229. Pulser 229 responds to positive going transitions of the inverted signal to generate a stream of pulses; accordingly, the pulser 225 output pulses on line 227 indicate positive going transitions of TES; whereas, the pulser 229 output pulses representing the negative going transitions of TES 160 which are supplied over line 231.

During high speed seeks, the pulses on lines 227 and 231 are combined in logic or circuit 234 and supplied as a single stream of pulses over line 235 to both NAND circuits 215 and 216. The activating signal line 207 partially enables the NAND circuits 215 and 216. Whenever a radially inward seek is occurring a control signal from microprocessor 40 received over line 591 completes the activation of NAND circuit 215 to supply output pulses over to NAND circuit 220. The NAND circuits 210 and 211 are quiesced to supply activating signals on both of their respective output line to NAND 220. NAND 220, therefore, passes the NAND 215 supply pulses over line 230 to counter 126 to count radially inward track crossings whenever the actuator velocity is below compare (205) reference. There are two pulses supplied for each track crossing; one corresponding to the grove and one corresponding to the mesa of disk 30. In a similar manner, during the radially outward seek, line 591 is not to carry an active signal, rather line 590 carries an activating signal from microprocessor 40 for activating NAND 216 to pass pulses from line 235 to NAND 221 which in turn passes the pulses over line 238 as radially outward track crossing indicating pulses to counter 126. Again NAND circuits 212 and 213 provide activating signals to NAND 221 whenever the relative velocity is below threshold level of comparator 205.

During a low speed portion of the seek, the line 207 carries an inactivating signal to NAND circuit 216 and 215. This inactive signal activates the NAND 215 and 216 supply an activating signal to NAND 200 and 221 respectively. Also during the low speed portion of a seek, inverter 208 supplies its activating signal over line 209 to NAND 210–213. During the high portion of the seek the inactive signal on line 209 activates all of the NAND 210–213 to supply activating signals respectively to NAND 220 and 221. During the low speed portion of the seek, the NAND 210–213 are all partially activated by the inverter 208 output signal. The completion of activation of these NAND circuits is by the combination of the QUAD signal received over line 152 and the TES pulses respectively on lines 227 and 231 turning first to the QUAD signal, limiter 240 squares the signal the receives analog signal to be a digital square wave. A digital square wave which is in phase synchronize with the sum signal 161 of FIG. 5 turn the Q signal that is supplied over line 241 to NAND circuits 211 and 212 respectively in radially in circuits 200 and radially out circuit 201. Inverter 242 inverts the Q signal to be 180 degrees out of phase therewith, as a minus Q signal supplied over line 246 to NAND circuit 210 and 213 respectively in the radially in circuits 200 and radially out circuits 201. The positive transition indicating pulses on line 227 travel to NAND circuit 210 such that when the minus Q signal is active and the positive transition is detected, the radially inward direction is indicated by NAND circuit 210 supplying a pulse to NAND 220. In a similar manner NAND circuit 211 responds to the Q signal on line 241 and to the negative transition indicating pulses on line 231 to supply a track crossing indicating pulse to NAND 220. Note that when the NAND 210 or 211 are not supplying a pulse, they are supplying a activating signal to line 220. Accordingly, NAND 220 acts as a negative logical OR circuit as controlled by the three NAND circuits 210, 211 and 215.

A radially out circuit 201 operates in a identical manner, NAND circuit. 212 receives the Q signal over line 241 and the positive transition indicating pulses on line 227 to supply pulses through NAND 221 to line 238. NAND 213 receives the minus Q signal from line 246 and the pulses indicating negative transitions on line 231 to pass the pulses to NAND circuit 221 to thence to line 238. NAND 210–213 are activated only during the low speed portion of the seek for passing the pulses as above described.

The NAND circuits are described as operating with an activating signal where in a NAND circuit receives all activating signals it outputs an inactive signal. When a NAND circuits receives and inactivating signal on any one of its inputs, it supplies and activating output. This convention is used in the description.

What is claimed is:

1. In apparatus for sensing signals recorded on an optical record disk including, in combination:

said optical disk having a spiral groove structure interleaved with a spiral land structure with data signals being recorded on one of the structures, a spiral data storing track disposed on one of said structures;

means for shining a beam of light on the optical disk for impinging the beam of light as a spot on said structures;

headarm means for carrying a transducer in said shining means for intercepting light reflected from the optical disk and for relatively moving the transducer radially of the disk across said structures for accessing said spiral data storing track;

a multielement detector having a plurality of light responsive elements for receiving said reflected light from said transducer and for respectively generating a plurality of electrical signals;

tracking error means connected to two predetermined ones of said light responsive elements for receiving respective ones of said plurality of electrical signals for generating a tracking error signal TES that indicates a radial positional relationship of the transducer with respect to said structures;

quadrature means connected to all of said light responsive elements for receiving and summing all of said plurality of electrical signals for generating a QUAD signal;

during said relative movement radially of said disk while said transducer means is crossing said structures, said tracking error means and said quadrature means respectively generating TES and QUAD signals respectively having signal peak amplitudes spaced apart 90 degrees;

means for calibrating the reflectance of the optical disk at said structures including reflectance of said data storing track at a plurality of radially-displaced circumferentially-extending zones of the disk and having means for receiving and storing the calibration of the reflectance as respective correction factors, each of said zones including a predetermined portion of said data-storing track; and correction means connected to said calibrating means and to said quadrature means for receiving the stored correction factors for generating a correction signal for each of said areas on the disk and for modifying said QUAD signal amplitude by subtracting the stored correction factor from the QUAD signal.

2. In the apparatus set forth in claim 1, further including, in combination:

said calibration means including means for comparing the light intensity of said light beam reflected from the groove structure with the light intensity of said light beam reflected from the land structure, offset means in the comparing means for generating said offset correction factor as a mean value between the light intensity of said light beam reflected from said groove and land structures, and gain means in the comparing means for subtracting the reflected light intensity reflected from said groove structure from the intensity of light reflected from said land structure said correction means including baseline offset correction means for correcting the baseline of the QUAD signal and including gain correction means for correcting the amplitude of the QUAD signal.

3. In the apparatus set forth in claim 1, further including, in combination:

said two predetermined ones of said light responsive elements being separated by an axis tangentially aligned with the spiral groove structures:

said tracking error means differentially combining said two respective ones of said plurality of electrical signals for generating said TES multielement detector and receiving signals from all of said light responsive elements for summing all of the plurality of signals for generating said QUAD signal.

4. In the apparatus set forth in claim 1, further including, in combination:

control means connected to said calibrating means for actuating said calibrating means to calibrate the reflectance in both said grooves and said land structures in every one of said first plurality of said zones, said calibration of the reflectance constituting shining a constant intensity light on the disk and measuring the reflected light intensity at each of said zones and said calibrating means having means for measuring the difference within each of said zones at each angular position of radially adjacent ones of said groove and land structures for generating said correction factors; and data storage means in the calibrating means for storing said correction factors.

5. In the apparatus set forth in claim 4, further including, in combination:

said quadrature means including a signal level shifter and a gain correction circuit connected to said data storage means for respectively receiving said offset and said gain correction factors for adjusting the QUAD signal to compensate for variations in the disk reflectance.

6. In the apparatus set forth in claim 5, further including, in combination:

said control means having power on means connected to said calibration means for actuating same to perform a reflectance calibration each time the apparatus is powered on.

7. In the apparatus set forth in claim 4, further including, in combination:

said control means having means for selecting said circumferential and radial positions in a matrix of evenly spaced-apart circumferential and radial positions; and said receiving means using said correction factors respectively in zones surrounding the respective positions.

8. In a machine-effected method of moving an optical transducer across a plurality of optical record tracks on an optical medium from an origin track to a target track, said optical medium having alternating elongated first and second structures, said optical record tracks being on respective ones of said elongated first structures, one of said structures being elongated grooves recessed into the optical medium and another of said structures being elongated land areas between said elongated groove structures, the method of measuring track-crossing directions;

the machine-executed steps of:

providing a multiple-element light detector having a plurality of light responsive elements, each said light responsive element for supplying an electrical signal indicative of light received by each element and the elements being arranged such that the optical record tracks lie along a line disposed between two predetermined ones of the light responsive elements in the detector;

shining a light beam onto the medium such that light reflected from the medium impinges on the two predetermined ones of said light responsive elements for actuating the two predetermined ones of said light responsive elements to generate two respective signals having amplitudes indicating a spatial relationship of the transducer with a nearest one of the said optical record tracks;

differentially combining said two respective signals for producing a tracking signal having signal baseline crossings for indicating said light beam crossing one of said optical record tracks;

summing the light impinging on all of the light responsive elements and supplying an electrical indication signal of the summing as a QUAD signal that is in phase quadrature to the tracking signal;

shining said light beam with constant intensity light on said structures and respectively measuring and indicating reflected light intensities from said groove and land structures, combining and indicated reflected light intensities to generate a compensation signal having an amplitude indicative of a mean light intensity of said two measured and indicated reflected light intensities respectively for said groove and land structures for generating a reflectance profile signal for the record tracks;

after generating said compensation signal, while shining light on the optical medium and while relatively moving said optical medium and said detector from said origin track toward said target track and while crossing ones of said tracks disposed between said origin and target tracks, combining the profile signal with said QUAD signal to produce a reflectance-variation compensated QUAD signal;

combining the tracking and reflectance-variation compensated QUAD signals for indicating the relative direction of the light beam at each of said track crossings; and counting the track crossings indicated by the tracking signal and assigning a sign to the count representing a direction of track crossing as indicated by the phase relation of summed electrical signal to the differential signal.

9. In a machine-effected method of first calibrating sensing signals from record tracks on an optical disk for then sensing signals using calibrated level offset and gain correction factor from said optical disk, said optical disk having variations in light reflectance across its recording area, said recording area having radially adjacent elongated groove and land portions, one of said portions having record track thereon, including the machine-executed steps of:

measuring and indicating the reflectance values of a one of the record tracks at predetermined radial and circumferential positions in the recording area, storing the indicated reflectance values of the one record track of said one of said portions in a data storage means;

measuring and indicating the reflectance values in said radially adjacent portion no having said record track thereon in said predetermined radial and circumferential positions, storing said indicated reflectance values of said radially adjacent portion in said data storage means, subtracting said stored reflectance value for a first said portions from said stored reflectance value for a second said portion as a gain correction factor for reading signals from said record tracks on said one portion, averaging the values of said stored reflectance values for said one record track for generating a level offset correction factor for said record tracks;

storing the correction factors in said data storage means; and then sensing signals recorded on the disk and using said stored correction factors including shining a laser light onto the disk in the recording area and sensing a reflected light from said portion having said track and generating an electrical light signal therefrom and in the recording area adjacent said positions, reading the stored correction factors from said data storage means for such positions, respectively, and adjusting the level of light signal by said level offset correction factor and the amplitude of the light signal by said gain correction factor.

* * * * *